P. WELIN.
PNEUMATIC ACTION FOR MUSICAL INSTRUMENTS.
APPLICATION FILED JAN. 7, 1907.

928,296.

Patented July 20, 1909.
8 SHEETS—SHEET 2.

Witnesses:
C. F. Wesson
M. E. Regan

Inventor:
Peter Welin
By Attorneys
Southgate & Southgate

P. WELIN.
PNEUMATIC ACTION FOR MUSICAL INSTRUMENTS.
APPLICATION FILED JAN. 7, 1907.

928,296.

Patented July 20, 1909.

Witnesses:
C. F. Wisam
M. E. Regan

Inventor:
Peter Welin
By Attorneys
Southgate & Southgate

P. WELIN.
PNEUMATIC ACTION FOR MUSICAL INSTRUMENTS.
APPLICATION FILED JAN. 7, 1907.

928,296.

Patented July 20, 1909.
8 SHEETS—SHEET 6.

Witnesses:

Inventor:
Peter Welin.
By Attorneys
Southgate & Southgate

UNITED STATES PATENT OFFICE.

PETER WELIN, OF NEWCASTLE, INDIANA, ASSIGNOR TO ALBERT KRELL, OF NEWCASTLE, INDIANA.

PNEUMATIC ACTION FOR MUSICAL INSTRUMENTS.

No. 928,296.      Specification of Letters Patent.      Patented July 20, 1909.

Application filed January 7, 1907. Serial No. 351,085.

*To all whom it may concern:*

Be it known that I, PETER WELIN, a citizen of the United States, residing at Newcastle, in the county of Henry and State of Indiana, have invented a new and useful Pneumatic Action for Musical Instruments, of which the following is a specification.

This invention relates to that class of music playing devices which, whether in the form of automatic pianos or the like, or in the form of separate devices for playing ordinary musical instruments, are operated automatically.

Although this application contains certain additional features, it is in general an improvement on the invention set forth in my prior co-pending application for an automatic playing attachment for musical instruments, Serial No. 290,749, filed December 7, 1905.

The principal objects of the invention are to provide improved modulating means which can be controlled manually if desired, in a simple and convenient manner, preferably by the use of a slide valve and in connection with an indicator; to provide for operating such means to modulate notes individually or in sections, as for instance by octaves, and when a plurality of notes is modulated simultaneously to provide for bringing the parts into such position that each note as sounded will be accented without interfering with the modulating action, and for accomplishing this in a simple, convenient and efficient manner; also to provide an improved throttling mechanism for producing the modulating effect; to provide means for adjusting the tension of the throttling valve which is preferably used; and generally to improve and simplify the pneumatic actions for instruments of this character.

While this invention is illustrated as, and preferably is, applied to an automatic musical instrument, and as employing a hand-controlled modulating system, which is also preferred, it is to be understood that many features thereof are equally applicable to playing devices for musical instruments, and also to those constructions in which the modulating and accenting actions are automatically controlled, as by the perforated music sheet.

This application for patent is to be distinguished from certain other inventions which I have made and for which I have filed applications, by the fact that it covers the invention broadly as just stated. My application for patent on "Automatic modulating mechanism for musical instruments", Serial No. 351,086 filed January 7, 1907 is along similar lines and it relates more particularly to means for automatically operating or controlling the modulation from the music-sheet and tracker-bar both in combination instruments and separate players and is in a general way confined to such automatic means as distinguished from the hand-operated means which this application is broad enough to include. Certain features which relate more especially to the automatic operation from the music-sheet and tracker-bar particularly for separate players for musical instruments, form the subject matter of my copending application for patent on an "Automatic player for musical instruments", Serial No. 351,058, filed on the same date and the broader invention applicable to separate playing devices controlled either manually or automatically is set forth in my application for patent on a "Player for musical instruments" filed on the same date, Serial No. 351,087.

Reference is to be had to the accompanying drawings which illustrate a practicable mode in which the above mentioned principles can be applied and in which—

Fig. 4 is a sectional view of the same on the line 4—4 of Fig. 3. Fig. 8ª is a sectional view on the line *a—a* of Fig. 5.

Figure 20:
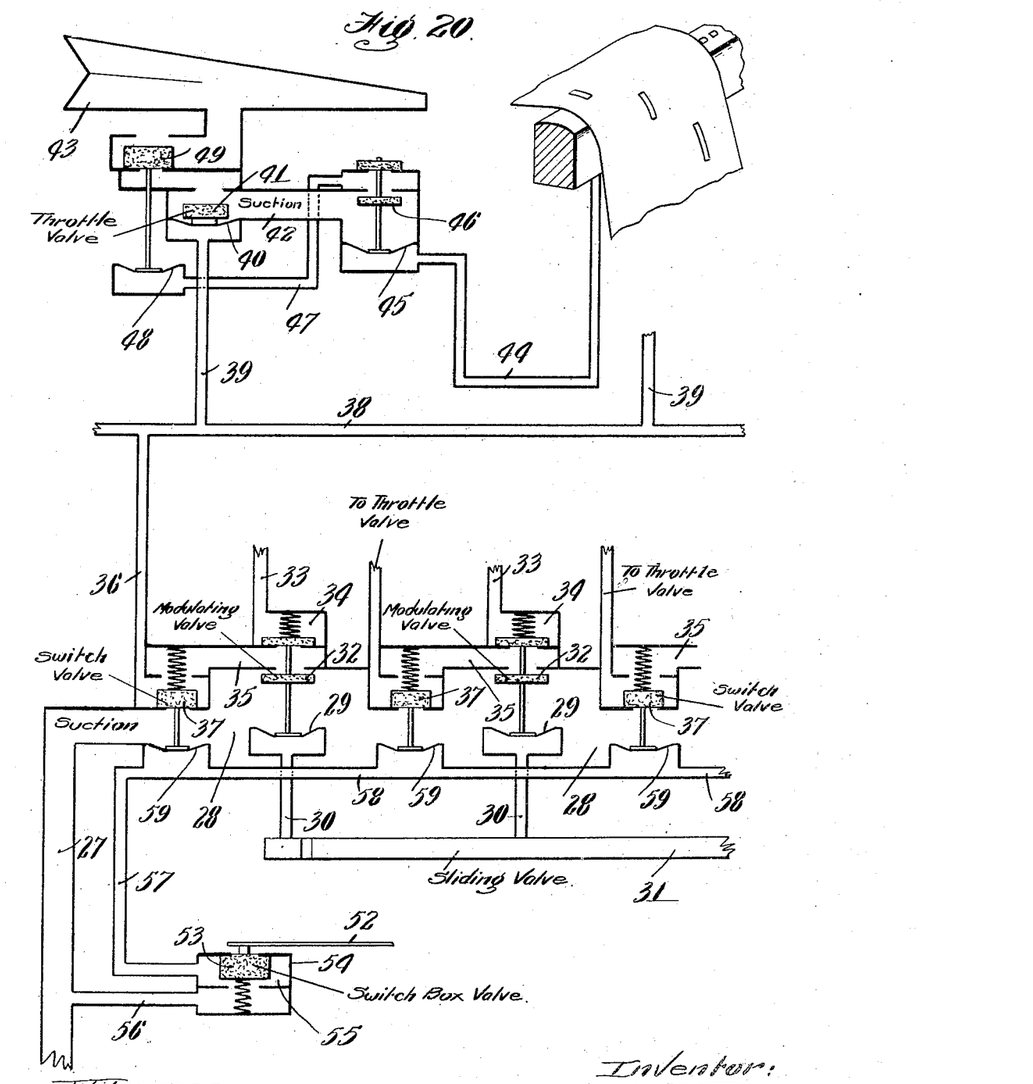
Fig. 20 is a diagrammatic view indicating certain features of the invention and showing how the several parts may be connected together.

By reference to Fig. 20, the general characteristics and operation of a device exhibiting the principles of this invention can be observed. A tube 27, which will be referred to as the suction tube connects a reservoir (not shown) with a suction chamber 28 of the modulating valve box. In this chamber are located a series of pneumatics 29, one for each note, or series of notes, as desired. In the present instance one of these pneumatics is shown for each octave. These pneumatics are supplied, as desired, with atmospheric air through channels 30, individually controlled by a sliding valve 31 to permit the admission of air to any desired one or more of the pneumatics. When air is admitted, it raises the pneumatic and operates a valve 32. The raising of this valve admits atmospheric air through a passage 33, a chamber 34, and a passage 35 to a tube 36. The passage 35 is controlled by a valve 37. If this valve is open, the atmospheric air will pass through the passage 35 and along the corresponding tube 36 to a channel or series of channels 38 which, if a plurality of notes are to be modulated simultaneously, are connected together, in sections, with a plurality of modulating channels 39, which in the form shown, are connected with the pneumatics of an octave. The air passing through the channels 36, 38 and 39 operates a pneumatic 40 to lift a throttle valve 41 located in a suction chamber to throttle the passage between this chamber and the striking pneumatic 43. The parts so far described constitute a pneumatic modulating or softening means. The operation of this pneumatic is preferably controlled by the music sheet, the perforations of which admit air through tubes 44 to primary pneumatics 45. In each case this raises a valve 46 to cut off the suction from a channel 47 and admit atmospheric air thereto so as to raise a secondary pneumatic 48 and its valve 49. This valve connects the striking pneumatic 43 for that note with the suction chamber.

It will be observed that with the construction specified the throttle valves of all the notes of an octave will be set simultaneously so that when their striking pneumatics are connected with the suction chamber by the action of their respective pneumatics 48, the air passages will be throttled to soften or modulate the tone. If, while this state of affairs continues, it is desired to put the parts into such condition that if one or more of the notes of that octave or section be sounded the same will be accented, a lever 52 is manipulated to force down a valve 53 in a switch valve box 54 so as to admit atmospheric air to the chamber 55 therein. Previously, this chamber has been in connection through a tube 56, with the suction chamber 28 and the depression of the valve cuts off the suction and permits atmospheric air to pass through a tube 57 to a switch valve chamber 58 which is provided with a plurality of pneumatics 59, each one adapted to operate one of the valves 37 to close it. The air in the chamber 58 simultaneously operates all of these valves and so cuts off the air from the passages 35 and connects them with the suction chamber 28, thus preventing the softening action of any note or notes in that octave or section which may be sounded while the lever 52 remains depressed, although the position of the modulating valves 32 is not changed. These ports constitute a pneumatic accenting means controlling a part of the modulating means.

From a consideration of the above it will be seen that by the proper construction and operation of the sliding valve 31 and by the manipulation of the lever 52, any desired octave or other set of notes can be softened or modulated when they are operated from the tracker-bar in the usual way, and that if desired, the parts may be set so that any one or more of those which are softened can be accented without interfering with the operation of the modulating mechanism. Furthermore, the principles of the invention can be carried out in a comparatively simple manner and for illustration of a practical construction of the same reference is to be had to the other figures.

Figure 1:
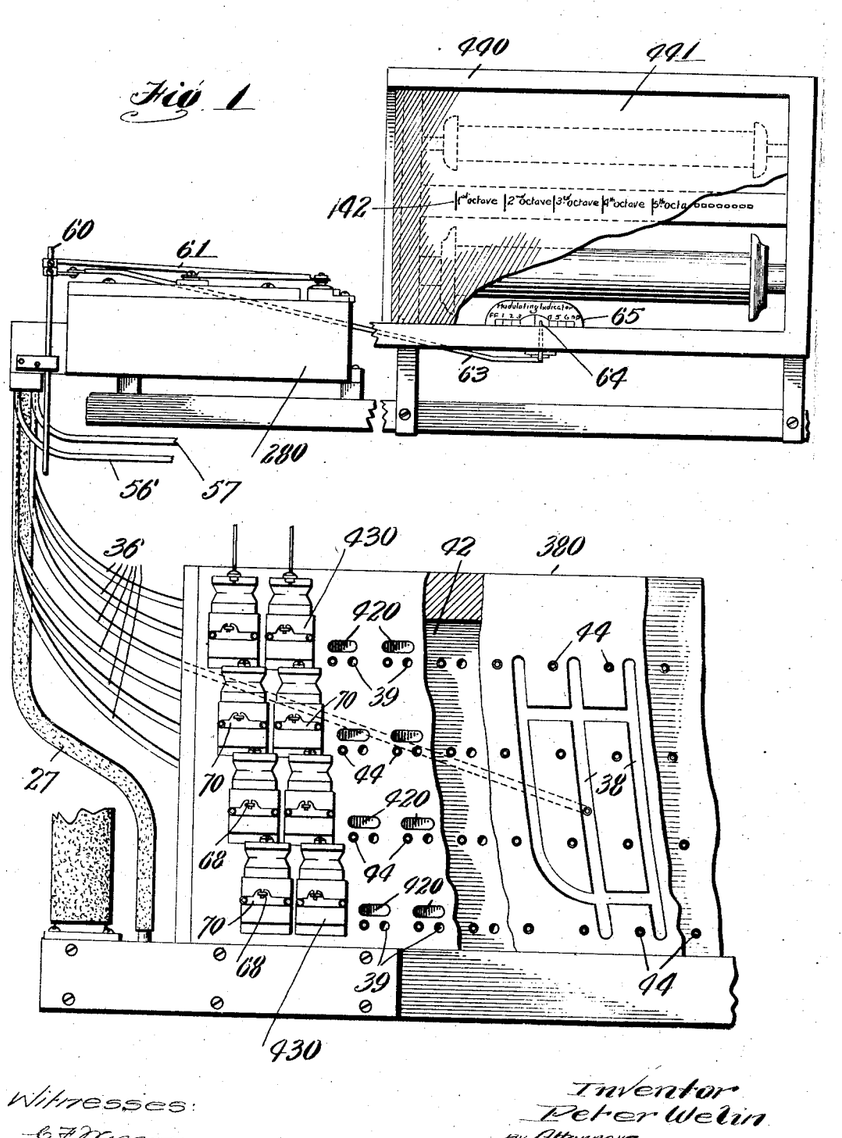
Figure 1 is a front elevation of a portion of an automatic musical instrument showing the tracker-box, a modulating valve box and a channel board with connections.
Figure 2:
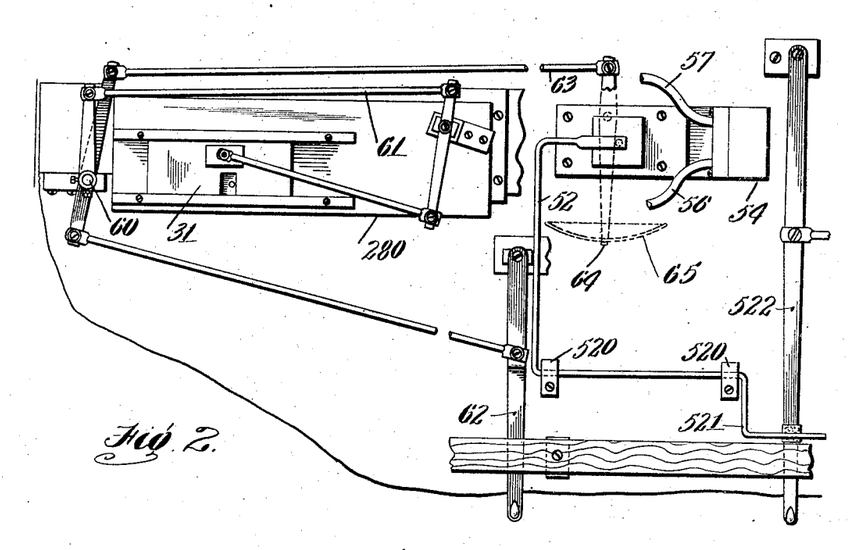
Fig. 2 is a plan of the modulating valve box showing a sliding valve and connections for operating it and also illustrating a switch valve box and its connections.

By reference to Figs. 1 and 2, it will be seen that the modulating valve box 280 is located adjacent to the tracker-box 440. The tracker-box may be of any desired construction but is shown as provided with a glass front plate 441 on which is located a scale 442 above the tracker bar so that the perforations in the paper can readily be seen through the scale and their position relative thereto observed. As the invention is illustrated in that form in which each passage 38 connects with the pneumatics of an entire octave, the scale is shown as indicating octaves.

The operation of the sliding valve 31 is shown as accomplished through a rock shaft 60 connected with the sliding valve by link work 61 and connected with an operating lever 62. The rock shaft 60 is also connected by links 63 with a pointer 64 passing over a curved indicator 65 on the tracker-box and showing the position of the sliding valve and the octaves or other sets of notes which are modulated.

The sliding valve 31 can be constructed in many ways and the position of the openings in the top of the modulating valve box which communicate with the modulating valve pneumatics will, of course, modify the construction of the valve. It is shown, however, in Figs. 5, 6 and 7, as consisting of two plates; a top or cap plate 310 and a perforated bottom plate 311. The modulating valve box is also provided with a top plate 300 and in this plate are two series of openings or passages, there being six in each series in the present case as there are six octaves to which they are to connect. The passages of one series are designated $30^a$, $30^b$, $30^c$, $30^d$, $30^e$, and $30^f$, respectively. Those of the second series are designated $30^A$, $30^B$, $30^C$, $30^D$, $30^E$, and $30^F$. Each of the pneumatics 29 is connected with one passage in each series. The passages of one series are so located that on the travel of the valve they will all be either covered or exposed simultaneously. Therefore, if the valve has a straight sliding motion as shown, and a straight end, they are located in a straight line but they are shown as located in two lines and the valve 31 as being provided with notches 312 for admitting air to those in the rear row, at the same time that air is admitted to those in the other row, the position of the passages and shape of the end of the valve being mutually dependent on each other, and on the kind of motion imparted to the valve 31.

Figures 5, 6, 7, 8:
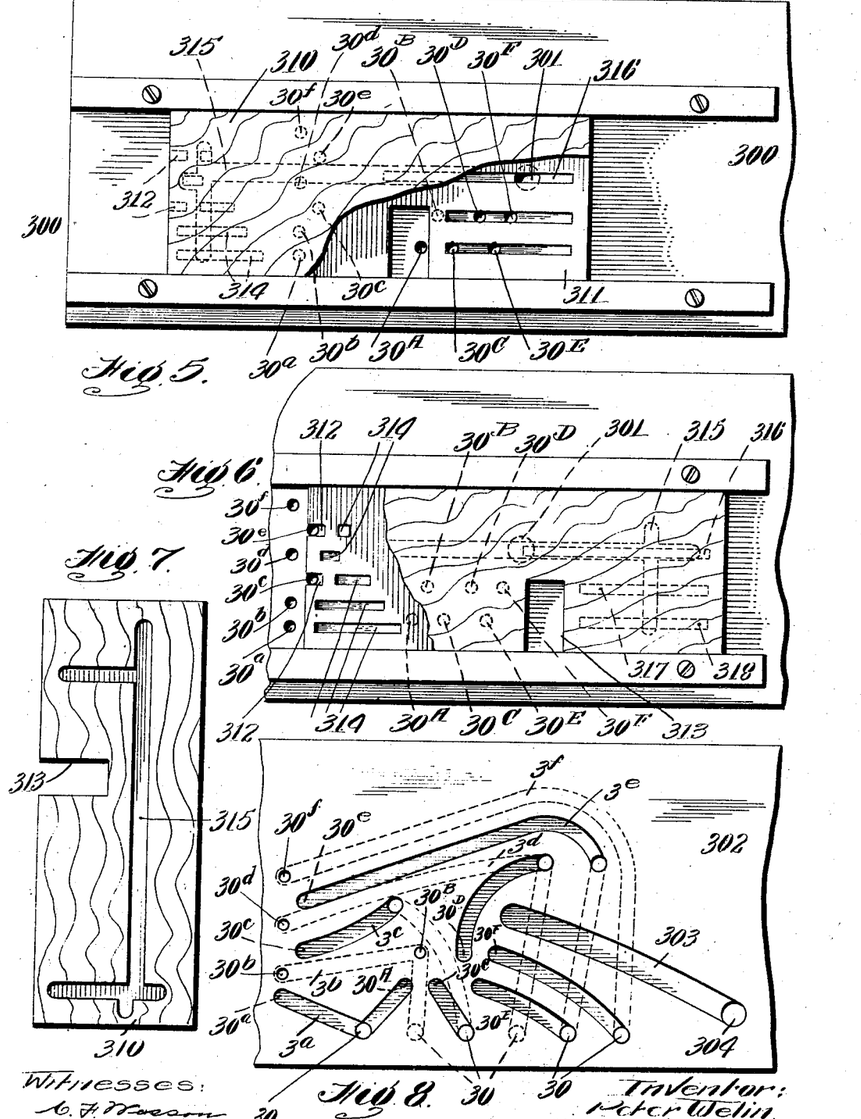
Fig. 5 is a plan of the sliding valve with portions removed to show interior construction.
Fig. 6 is a similar view of the valve in a different position.
Fig. 7 is a bottom plan of the top plate of the sliding valve.
Fig. 8 is a plan of the second plate of the modulating valve box, the top plate being removed.
Figure 8A:
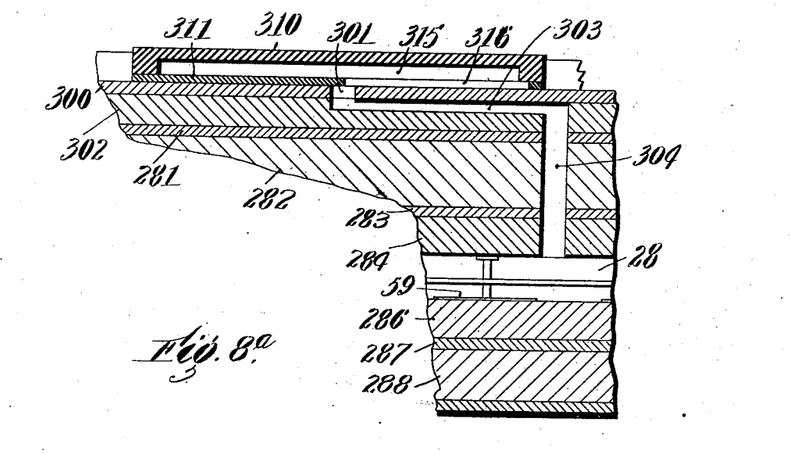
Figure 9:
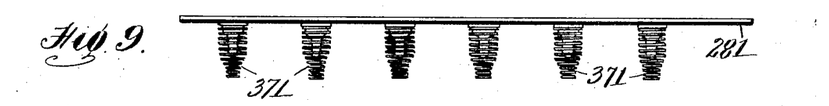
Fig. 9 is a side elevation of a plate forming part of the modulating valve box showing a series of springs for assisting in operating the accenting valves.
Figure 10:
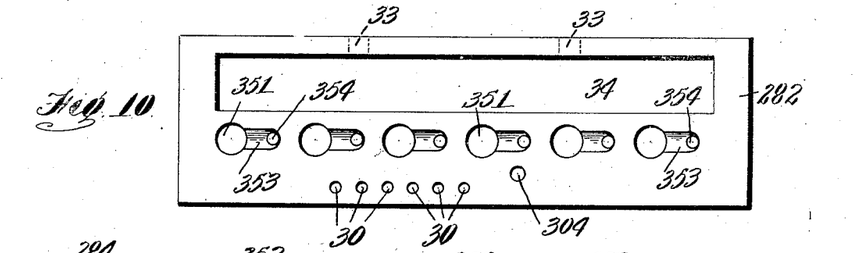
Fig. 10 is a plan of another plate constituting a part of the modulating valve box and located immediately below the plate shown in Fig. 9.
Figure 11:
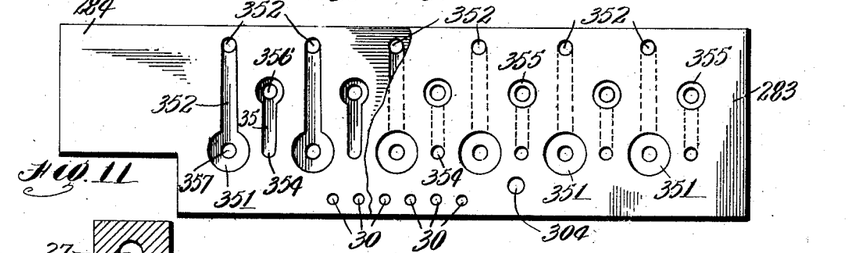
Fig. 11 is a plan of two plates located below the plate shown in Fig. 10, the left-hand side of the upper of these two plates being broken away.
Figure 12:
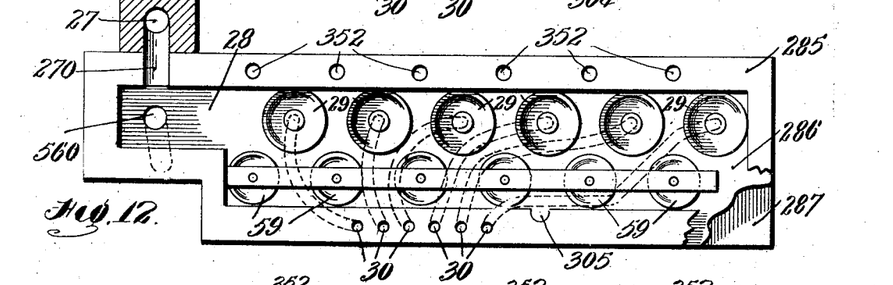
Fig. 12 is a plan of mechanism located below the plates shown in Fig. 11.
Figure 13:
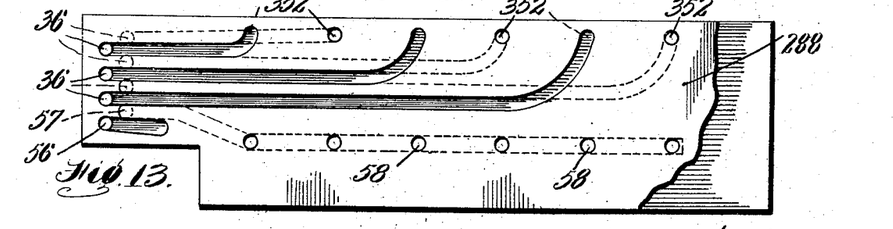
Fig. 13 is a plan of a plate located below the plates shown in Fig. 12 and constituting the lowest channeled plate of the modulating valve box.
Figure 14:
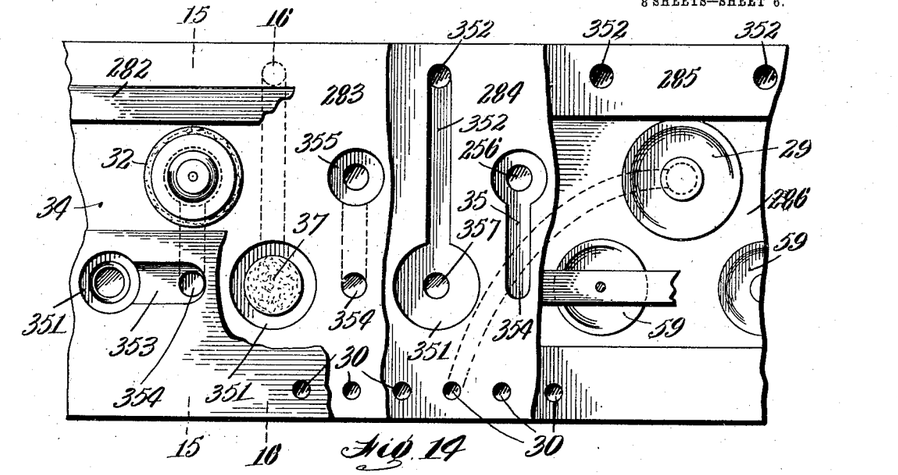
Fig. 14 is a plan of certain portions of the modulating valve box on enlarged scale with the horizontal plates broken away in different planes to show the relative positions of the parts, illustrating the plates shown in Figs. 10, 11 and 12.

When the valve is in the position shown in Fig. 6, all the passages $30^a$, $30^b$, etc. are exposed to the air. If the valve now moves to the left, they will each first be closed by the valve and on further movement of the valve in the same direction, the passages $30^a$, $30^b$, $30^c$, $30^d$ and $30^e$ will be bled by being located under a series of perforations 314 in the bottom plate of the valve. These perforations are of different lengths to provide for keeping them in communication with the several passages in the plate 300 different periods of time and they all communicate with a channel 315 in the lower side of the top plate 310. This channel also communicates with another perforation 316 in the bottom plate 311 which, throughout the travel of the valve, is located over a passage 301 in the plate 300 which communicates with the suction chamber 28 so as to bleed the several pneumatics 29 when the valve is in the proper position therefor.

In the position just described all the pneumatics except one will be placed in communication with this passage 301 and restored to their normal condition ready for further operation. The reason the passage $30^f$ is not bled at this time is because a notch 313 in the valve now comes into registration with the passage $30^F$ which is connected with the same pneumatic as the passage $30^f$. Consequently, the pneumatic connected with these two passages is open to the air and that octave is modulated.

In the form shown, the passages of the second series are arranged in two parallel lines which are in the line of motion of two perforations 317 and 318, in the bottom plate 311 which communicate with the passage 315; whereby all the pneumatics can be bled in an obvious manner. On further movement to the left the passage $30^F$ is exposed to the air while that perforation 314 with which the passage $30^e$ was connected now passes beyond that passage and the bleeding of the pneumatic 29 connected with the passages $30^E$ and $30^e$ is stopped. As the valve continues to move to the left, these operations are repeated with the other passages and pneumatics. When the passage $30^F$ is closed by the advancing side of the notch 313, it comes into communication with the perforation 317 in the bottom plate 311, to bleed that pneumatic. The corresponding perforation 318 successively connects the perforation $30^E$ and those in line therewith with the channel 315 in the same way.

It will be seen that as the valve moves, the indicator 64 moves with it and shows which octaves are modulated. In the form shown, this indicator when on the numeral 6 indicates that the sixth octave alone is modulated, but when on the numeral 5 it indicates that both the fifth and sixth are modulated and when on the numeral 4 it shows that all three are connected in this manner. In the spaces between the numerals 4 and 3 there will be positions in which octaves 4 and 5 and then octaves 3 and 4 are modulated. The same state of affairs occurs on the other side. When the pointer is beyond the scale on the left, it indicates that all the passages of one series are closed and there is no modulation, but when beyond the scale on the right, it indicates that they are all open, the slide being in position shown in Fig. 6, and all the notes of the instrument are modulated.

The passage of the air from the two series of passages represented by the characters 30ᵃ and 30ᴬ, etc., to the pneumatics 29 will now be traced. Fig. 8 shows a plate 302 containing continuations of the two series of passages in the plate 300, these continuations being given the same reference characters as they are in the plate 300. Channels are provided either in the top or bottom of the plate 302 for connecting the passages of the two series. For example, a channel 3ᵃ connects the passages 30ᵃ and 30ᴬ. Channels 3ᵇ, 3ᶜ, 3ᵈ, 3ᵉ, and 3ᶠ are also provided for connecting the other passages. Some of these channels are located entirely on one side of the plate, while others are located partly in one side and partly in the other, the two parts being connected by a perforation. Each of these channels is also so formed as to communicate with one of the series of six channels 30. It will be seen, therefore, that through the series of channels 3ᵃ, 3ᵇ, 3ᶜ, 3ᵈ, 3ᵉ, and 3ᶠ, which are connected with the pneumatics 29, all of the passages of the two sets in the top plate 300 are put into communication with their respective pneumatics. The passage 301 is located directly over and terminates in, a channel 303 in the plate 302 which communicates with a perforation 304. This perforation communicates with the suction chamber 28 as has been stated. Below the plate 302 are a series of parallel plates 281, 282, 283, 284, 285, 286, 287 and 288. These plates when properly located, together with the plates 300 and 302, constitute the modulating valve box. By reference to Fig. 15, it will be seen that each of the passages 30, extends through all of these plates except 287 and 288. Each passage 30 communicates with the corresponding pneumatic 29 which is supported on the top of the plate 286. The suction chamber 28 is located in the plate 285 and bounded on the top and bottom by the plates 284 and 286. The former of these plates has a passage for the valve 32 to connect the suction chamber with the passage 35 above mentioned, which is located in the plate 284. The plate 285 has a channel communicating with the passage 304 which thus leads to the suction chamber. In the plate 282 is located the chamber 34 which is in communication with the outside air through the passages 33. Although in Fig. 20 a separate one of these chambers and passage is shown for each modulating valve, it is preferred to construct the same in the form of a single long chamber extending throughout the main part of the length of the plate 282.

Figures 15, 16:
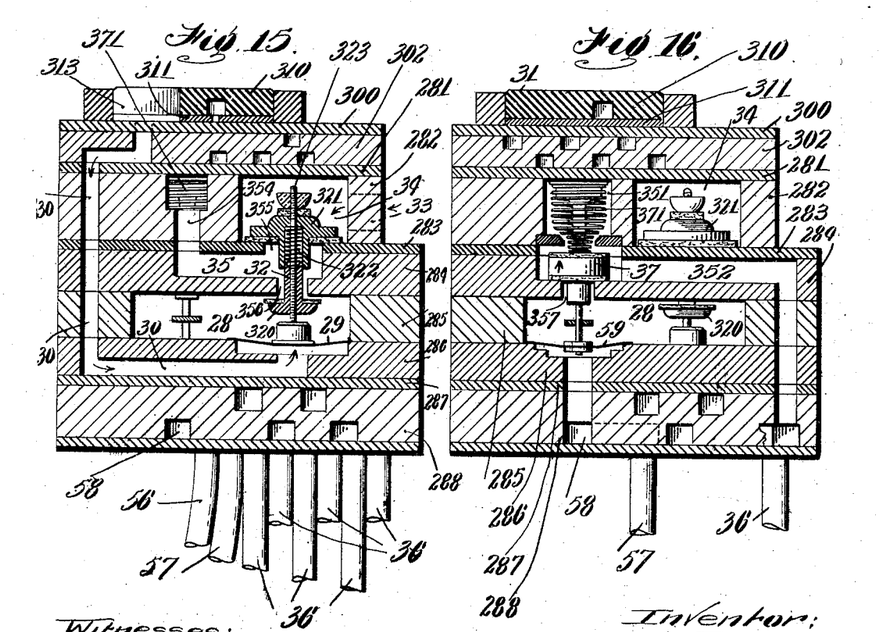
Figs. 15 and 16 are sectional views taken on the lines 15—15 and 16—16, respectively, of Fig. 14.

By reference to Fig. 16, it will be seen that the passage 35 communicates with one of the tubes 36 except when the passage is closed by the switch valve 37. The construction of the various elements making up this part of the apparatus can be varied within wide limits but a convenient way in which the various passages and other features can be located is illustrated in the drawings. Into the passages 351 of the plate 282 project a series of springs 371 carried by the plate 281 each for engaging a valve 37 and normally assisting in holding it down onto its lower seat. The plate 282 is provided with perforations which constitute portions of the passages 35. This is illustrated in the form of a series of direct perforations 351 each communicating with a channel 352 communicating with the passage 35 and in the top of the plate 282 these perforations 351 are connected with slots 353 which communicate with perforations 354 which in turn communicate through perforations in the plate 283 with the main parts of the passages 35. The plate 283 also contains continuations of the perforations 351 and a series of perforations 355 constituting seats for the upper part of the valve 32. The plate 284 also contains the perforations or channels 351 and 354 and the main parts of the passages 35 which extend upwardly through the perforations 355 through which the valve 32 passes. The passages 35 are connected with the suction chamber by perforations 356. The next plate below, namely, that numbered 285, as has been stated, contains the suction chamber 28 into which the perforations 356 enter and it also communicates through perforations 357 with the passages 352 in the plate 284. These passages 352 extend down through the plate 285 as well as through all the plates below it and as has been said, the passage 304 extends into the notch 305 in the plate 285 through which it connects with the suction chamber. This plate also has a channel 270 communicating with the suction pipe 27 and a channel 560, entering the next plate 286, which communicates with the tube 56. The latter plate contains perforations constituting part of the passages 30, and 352 and of the chamber 58, channels in the under side of this plate also constituting part of the passages 30. The next plate numbered 287 contains a part of the passage 560 but aside from this, this is merely provided with two sets of six perforations, each constituting portions of the passages 352 and chamber 58. The same is true of the bottom plate 288 and this is provided with six channels on its upper and lower faces connecting the passages 352 with the tubes 36. It also has a channel constituting part of the chamber 58 and connecting it with the tube 57 and also one channel constituting part of the passage 560 and connecting it with the tube 56. This makes eight perforations in the bottom part of the modulating valve box for connection with the several tubes 36, 56 and 57.

Figure 3:
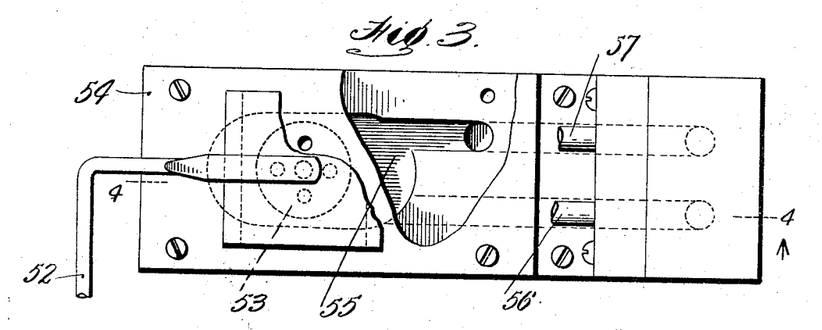
Fig. 3 is a plan of the switch valve box with portions removed to show interior construction.
Figure 4:
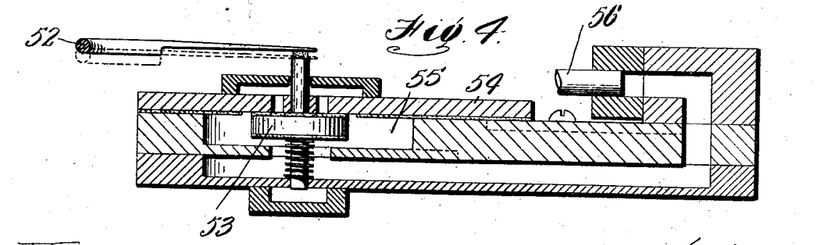

The tubes 56 and 57 are connected with the switch valve box 54 in a manner indicated in Figs. 3 and 4. The construction of this box has been indicated by the description above given and the manner of operating the lever 52 is all that need be described. It will be noted that this lever is raised and lowered to operate the valve 53 instead of being swung on a vertical pivot as is the case with most of the levers employed on instruments of this character. It is shown in Fig. 2 as being pivoted in bearings 520 and as having an arm 521 which is adapted to be operated by the raising and lowering of any desired one of the levers employed for regulating the instrument. It might be operated by the lever 62 but it is shown as operated by the tempo lever 522, the lever being moved to operate the valve in a plane parallel with the axis of the pivot on which it swings to regulate the tempo.

The channels 38 are located in a channel board 380 and are shown in the form of series of connected channels each of the series communicating in this instance, with eleven valve boxes and striking pneumatics. This communication is made in each instance through one of the passages 39. This channel board is also provided with one perforation 420 for each valve box, communicating with the suction chamber 42. These various passages communicate with the valve boxes 430 in any desired manner to carry out the principle as indicated in Fig. 20.

Figures 17, 18, 19:
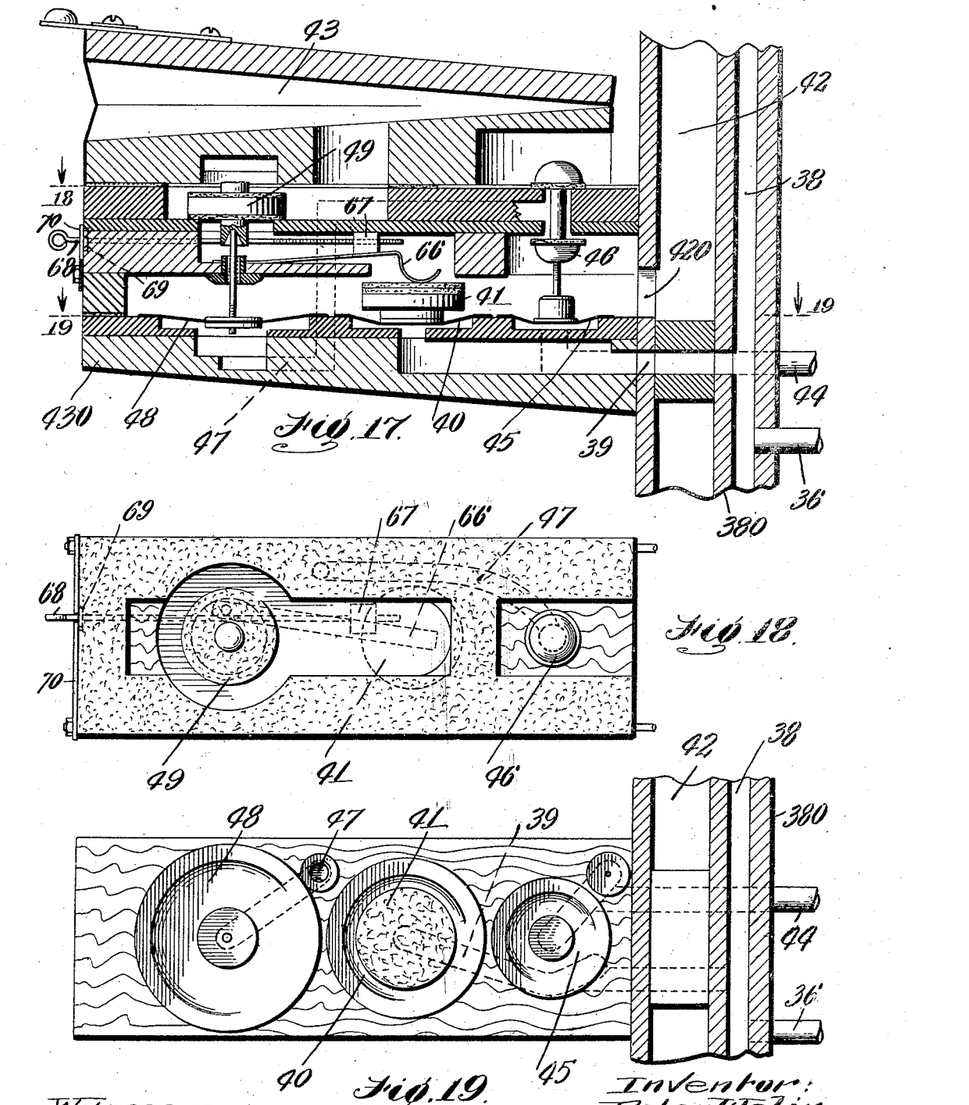
Fig. 17 is a longitudinal sectional view of one of the pneumatics showing its connections.
Figs. 18 and 19 are plans with the parts above the lines 18—18 and 19—19 respectively of Fig. 17 removed.

By reference to Figs. 17, 18 and 19, a practical manner of connecting these elements will be seen. The operation of this part of the device has been sufficiently described with reference to Fig. 20. One feature, however, is indicated in detail in this figure which is not shown in Fig. 20. This is a resilient means for controlling the operations of the throttle valve 41 and an adjustment therefor. This is constructed as follows: A spring 66 is provided for normally holding the valve 41 down and preventing its rising far enough to throttle the air passage. As these springs are liable to lose part of their resiliency in use, means is provided for adjusting the tension thereof. For this purpose each spring 66 is so formed that the part extending from the stationary end of the spring is on an incline and a block 57 is mounted between this incline and the wall of the passage in which it is located, this block being adapted to limit the motion of the spring in one direction. Means is provided for shifting this block back and forth to adjust the tension of the spring. This means is shown in the form of a screw 68 extending out of the valve box so that it can be manipulated from the outside. The screw 68 is held in adjusted position by means of a nut 69 thereon which is in turn held by a clamp 70 secured in position by the bolts by which the valve-boxes are fastened.

The valves 32 may if desired, be made in the form of differential valves as is indicated in Fig. 15. In this case each one has a valve member 320 for closing the passage 356 and a valve member 321 for closing the passage 355, these two members being movable together and also independently. A spring 322 normally holds them apart. The pneumatic in rising, first forces up the rod 323 carrying the member 320 to its seat, then the spring unseats the member 321. I do not herein claim this differential valve as it forms the subject of a separate application. It will be obvious, therefore, that with a construction such as that illustrated, the principles set forth in connection with the description of Fig. 20 can be practically and simply carried out and that provision is made for accomplishing all the results which have been referred to.

It will be observed that this application contains features somewhat similar to certain features set forth in each of my above mentioned applications. The sliding valve set forth herein is intended as an improvement over the oscillating valve set forth in my above mentioned application, Serial No. 290,749. The valve box also shown most clearly in Fig. 17 of this case is an improvement over a somewhat similar construction shown in said application. As to my other three above identified applications, it may be said that while they show certain features represented in this case either by the same or similar mechanism, it is intended to claim all such features in this case, both broadly and specifically with the exception of the differential valve shown most clearly in Fig. 15 which forms the subject matter of my co-pending application on a "Valve for pneumatically controlled musical instruments", Ser. No. 351,089, filed January 7, 1907. The throttle valve adjusting device shown most clearly in Fig. 17 is not specifically claimed herein, as it is claimed in my above mentioned case, Ser. No. 351,086. The sliding valve also is claimed herein only in combination, as it is broadly claimed in my application 351,087.

While I have illustrated and described a particular form in which the invention can be embodied, I am aware that many modifications may be made therein by any person skilled in the art without departing from the spirit of the invention as expressed in the claims. Therefore, I do not wish to be limited to the exact construction shown but What I do claim is:—

1. In a music playing device, the combination of a plurality of pneumatic means for modulating or softening a series of notes, with pneumatic means for controlling a part of each of said modulating means to accent the notes while the remainder of said modulating means is in operative position.

2. In a music playing device, the combination of a plurality of pneumatic means for modulating or softening a series of notes, and manually controlled means for controlling a part of each of said modulating means to accent the notes while the remainder of said modulating means remains in operative position.

3. In a music playing device, the combination of a plurality of manually controlled pneumatic means for modulating notes, and means for controlling a part of each of said modulating means to accent the notes while the remainder of the modulating means is in operative position.

4. In a music playing device, the combination of a modulating valve, means controlled from said modulating valve for modulating or softening a series of notes, means for operating said modulating valve, and means for controlling a part of said valve controlling means to accent the notes while said modulating valve remains in position for modulating the notes.

5. In a music playing device, the combination of a modulating valve, means controlled from said modulating valve for modulating or softening a series of notes, means for controlling a part of said valve controlling means to accent the notes while said modulating valve remains in position for modulating the notes, manually operated means for controlling said modulating valve, and manually operated pneumatic means controlling the second means.

6. In a music playing device, the combination of a modulating valve, connections controlled thereby for modulating or softening a series of notes, manually controlled pneumatic means for operating said modulating valve, and means for controlling a part of said connections to accent the notes while said valve remains in position for modulating the notes.

7. In a music playing device, the combination of a plurality of manually controlled pneumatics, a modulating valve operated by each of said pneumatics, means controlled by each of said modulating valves for modulating a series of notes, and means for controlling a part of each of said modulating means to accent the notes while the modulating valves are in position for modulating the notes.

8. In a music playing device, the combination of a tracker bar, striking pneumatics means controlled from the tracker-bar or the like for operating a striking pneumatic for each note, throttle valves, manually controlled means for setting a series of said throttle valves to soften their respective notes when operated from the tracker-bar, and means for operating a portion of said manually controlled means to set the throttle valves to accent a note while the remainder of the manually controlled means remains in position for modulating all the notes of the series.

9. In a music playing device, the combination of a tracker-bar a plurality of striking pneumatics, means controlled from a tracker bar for operating the same, a throttle valve for each of said pneumatics, means for setting a series of said throttle valves to cause the notes controlled thereby to be softened, and manually controlled means for controlling a portion of said means to take the throttle valves out of throttling position while said setting means of the series remains in position for operating the throttling valves of that series.

10. In a music playing device, the combination of a series of throttle valves, a pneumatic for each of said valves, a suction chamber normally connected with said throttle valves, pneumatic means for closing the connection between the suction chamber and a series of said pneumatics and admitting atmospheric air to the pneumatics of said series to place them in throttling position, and means for connecting the throttle valve pneumatics of the instrument with the suction chamber to withdraw them from operative position while the said closing means is in operation.

11. In a music playing device, the combination of a plurality of series of throttle valve pneumatics, a suction chamber normally connected with all of said pneumatics, means for disconnecting the pneumatics of any one of said series from the suction chamber and admitting atmospheric air thereto, and means for making connection between all of said pneumatics and the suction chamber while said disconnecting means remains in its operative position, whereby when the last named means is returned to inoperative position, all the throttle pneumatics of said series will be left in modulating position.

12. In a music playing device, the combination of a plurality of series of throttle valves, pneumatics therefor, a suction chamber having connection with said pneumatics, a modulating valve for each of said series adapted to connect the throttle valve pneumatics of its series with the suction chamber or the outside air, a plurality of switch-valves, one for each series, and connections whereby they are simultaneously operable to connect all of the throttle valve pneumatics with the suction chamber independently of the position of the modulating valves.

13. In a music playing device, the combination of a suction chamber, a plurality of series of throttle valves, pneumatics therefor normally connected with the suction chamber, a modulating valve for each of said series to control the connection of the throttle valve pneumatics thereof with the suction chamber and with the outside air, a pneumatic in said suction chamber for each of said modulating valves, a switch valve for each of said series of throttle valve pneumatics, and pneumatics for operating all of said switch valves to connect all of the throttle valve pneumatics with the suction chamber independently of the position of the modulating valves.

14. In a music playing device, the combination of a plurality of series of throttle valves, a plurality of series of pneumatics therefor a modulating valve for each of said series of pneumatics, a pneumatic for controlling each of said modulating valves, a sliding valve for controlling the admission of air to said pneumatics, a suction chamber, channels connecting said throttle valve pneumatics with the suction chamber, each of said modulating valves constituting means for controlling one of said channels, and means operable independently of the modulating valves for connecting all of the channels with the suction chamber.

15. In a music playing device, the combination of a suction chamber, throttle valves, pneumatics therefor connected with the suction chamber, means for connecting said throttle valve pneumatics with the suction chamber or with the outside air comprising channels and modulating valves, and a switch-valve for connecting the channels with the suction chamber independently of the position of said modulating valves, a pneumatic in said suction chamber for operating the switch valve, and a switch box for operating said pneumatic, said switch box having a valve for normally preventing the admission of air thereto, and for permitting the connection of the same with the suction chamber.

16. In a music playing device, the combination of a plurality of switch valves, a suction chamber with which said valves are connected, a pneumatic for each of said switch valves, a channel communicating with all of said pneumatics, a switch-box communicating with said channel and with the suction chamber, and a valve in the switch box normally preventing the admission of air to said channel and capable of cutting said switch box off from direct communication with the suction chamber, and simultaneously admitting air to the switch-box and channel for operating said pneumatics.

17. In a music playing device, the combination of a switch-box having two chambers therein, a suction chamber with which one of said chambers communicates, a series of pneumatics with which the other chamber communicates, a perforated partition between said chambers, a perforated wall opposite said partition for admitting atmospheric air to the pneumatics, a valve adapted to close the perforation in the partition or wall, means for operating said valve, a valve box containing said suction chamber, striking pneumatics, and means in said valve box for modulating the striking effect of said striking pneumatics.

18. In a music playing device, the combination of a series of switch-valves, a pneumatic for each of said valves, a switch-valve box having means for controlling the admission of air to said pneumatics, a modulating valve-box having a suction chamber in which said pneumatics are located, a modulating valve, a pneumatic in said suction chamber for operating said modulating valve, and a sliding valve for controlling the admission of air to the last named pneumatic.

19. In a modulating valve box for music playing devices, the combination of a series of plates having a plurality of passages therethrough, a sliding valve for controlling the admission of air to said passages, a pneumatic connected with each passage, a suction chamber in communication with the other side of said pneumatic, a valve controlled by each of said pneumatics, a passage controlled by each of said valves, the valve constituting means for controlling the connection of the passage with the suction chamber or with the atmospheric air, and a switch valve in each of said passages.

20. In a modulating valve box for a music playing device, the combination of a series of plates having a passage therethrough, a valve for controlling the admission of air through said passage, a pneumatic at the end of said passage, a suction chamber communicating with the other side of said pneumatic, a second passage, a valve controlled by said pneumatic for controlling the connection of the second passage with the suction chamber or with the external air, a switch valve, a spring for normally holding said switch-valve from its seat, and a pneumatic located in said suction chamber and adapted to move the switch valve to close said passage independently of the position of the first mentioned valve.

21. A modulating valve box for music playing devices, having a series of passages therein, a modulating valve and pneumatic for each passage controlled by the admission of air thereto through the passage, a switch-valve and pneumatic for each passage, a passage for controlling the admission of air to and operating said switch valve pneumatics, a valve for controlling the admission of air to said passage connected with the second series of pneumatics, and means for controlling the admission of air to the first series of pneumatics.

22. A modulating valve box for music playing devices, having a series of passages therein, a modulating valve and pneumatic for each passage controlled by the admission of air thereto through the passage, a switch valve and pneumatic for each passage, a passage for controlling the admission of air to and operating said switch valve pneumatic manually operated means for simultaneously controlling the admission of air to all of the second series of pneumatics and manually operated means for controlling the admission of air individually to the first series of pneumatics.

23. A modulating valve box for music playing devices, having a series of passages therein, a modulating valve and pneumatic for each passage controlled by the admission of air thereto through the passage, a switch-valve and pneumatic for each passage, a passage for controlling the admission of air to and operating said switch valve pneumatics, means for controlling the admission of air to the second series of pneumatics, and a sliding valve having a plurality of passages for individually controlling the passage of air to the first series of pneumatics.

24. In a music playing device, the combination of a plate having passages, a pneumatic with which each passage is connected, a suction chamber, and a valve for closing said passages having a channel connected with the suction chamber, and means for connecting all closed passages with said channel to leave the pneumatics connected therewith in all positions of the valve.

25. In a music playing device, the combination of pneumatics, a channel connected with each of said pneumatics, and a suction chamber with a plate having two series of passages, one passage of each series being connected with one of the other series and with the channel connected with a pneumatic, the passages of one series being arranged in parallel lines, and those of the other series in parallel lines at an angle to those of the first series, and a valve having means for successively uncovering the passages of one series during the motion of the valve in one direction, said valve having passages located in position to register with the passages of one of said series when the valve moves into a position to cover them, and passages adapted to register with the passages of the other series when the valve covers the same, said valve also having a passage connected with the suction chamber and communicating with said passages in the valve.

26. In a music playing device, the combination of pneumatics, and a suction chamber, with a plate having passages therein, each communicating with a pneumatic for operating the same, and a movable valve having means for successively uncovering said passages during its motion, and means for connecting the covered passages with the suction chamber to leave the pneumatics connected with the suction chamber after the outside air is cut off therefrom.

27. In a music playing device, the combination of a series of striking pneumatics, a suction chamber, a valve for controlling the connection of said pneumatics with the suction chamber and with the outside air, means for operating said valve, a pneumatic and valve operable independently of the first named valve for throttling the passage therefrom to the suction chamber, a second suction chamber a modulating valve for controlling the connection of said throttling valve with said second suction chamber or with the outside air, and a switch valve for connecting said throttling valve pneumatic with the second suction chamber independently of the modulating valve.

28. In a music playing device, the combination of pneumatics, a plate having two series of passages, those of each series being at an angle to those of the other, means for connecting one passage of each series with a corresponding passage of the other series, and with a pneumatic, a suction chamber, said plate also having a channel connected with said suction chamber, and a valve having means for successively exposing the passages of one series to the open air and connecting the closed passages of the other series with the said suction shamber.

In testimony whereof I have hereunto set my hand, in the presence of two subscribing witnesses.

PETER WELIN.

Witnesses:
ALMA E. YAGER,
EDWIN B. PFAU.